United States Patent
Wehling (10) Patent No.: US 10,434,915 B2
(45) Date of Patent: Oct. 8, 2019

(54) GUIDE SLEEVE FOR A VEHICLE SEAT

(71) Applicant: Adient Luxembourg Holding S.à.r.l., Luxembourg (LU)

(72) Inventor: Karsten Wehling, Burscheid (DE)

(73) Assignee: Adient Luxembourg Holding S.à.r.l., Luxembourg (LU)

( * ) Notice: Subject to any disclaimer, the term of this patent is extended or adjusted under 35 U.S.C. 154(b) by 0 days.

(21) Appl. No.: 15/580,503

(22) PCT Filed: Jun. 13, 2016

(86) PCT No.: PCT/EP2016/063488
§ 371 (c)(1),
(2) Date: Dec. 7, 2017

(87) PCT Pub. No.: WO2016/198692
PCT Pub. Date: Dec. 15, 2016

(65) Prior Publication Data
US 2018/0178697 A1    Jun. 28, 2018

(30) Foreign Application Priority Data

Jun. 11, 2015  (DE) .................. 10 2015 210 713

(51) Int. Cl.
*B60N 2/897*   (2018.01)
*B60N 2/809*   (2018.01)
*B60N 2/818*   (2018.01)

(52) U.S. Cl.
CPC ............. *B60N 2/897* (2018.02); *B60N 2/809* (2018.02); *B60N 2/818* (2018.02); *B60N 2205/20* (2013.01); *B60Y 2306/09* (2013.01)

(58) Field of Classification Search
CPC ........ B60N 2/897; B60N 2/809; B60N 2/818; B60N 2205/20; B60Y 2306/09
See application file for complete search history.

(56) References Cited

U.S. PATENT DOCUMENTS 6,012,777 A * 1/2000 Wege ..................... B60N 2/815
                                                           297/410
7,429,086 B2 * 9/2008 Gans ........................ B60N 2/80
                                                           297/463.1
(Continued)

FOREIGN PATENT DOCUMENTS

DE    297 07 562 U1    8/1997
DE    197 17 942 A1    11/1998
(Continued)

*Primary Examiner* — Philip F Gabler
(74) *Attorney, Agent, or Firm* — McGlew and Tuttle, P.C.

(57) ABSTRACT

A guide sleeve, for receiving a rod of a headrest, includes a sleeve body that has a rod receptacle for receiving the rod and an elastic region that is force-loaded in a direction of the rod receptacle in order to fix the rod in the rod receptacle. A spring element arranged on the outer contour of the sleeve body spring-loaded the elastic region. The spring element has a contact region adjacent to the elastic region, is configured as a clip that partially embraces the sleeve body and has a width in a sleeve body axial direction. The spring element includes a strip main body and the contact region is configured as a protuberance between two first bending points extending across the entire width of the main body. A vehicle seat for a motor vehicle has a backrest and a headrest, wherein the guide sleeve fastens the headrest to the backrest.

20 Claims, 4 Drawing Sheets

(56) References Cited

U.S. PATENT DOCUMENTS

| | | | |
|---|---|---|---|
| 8,864,235 B2* | 10/2014 | Menges | A47C 7/38 297/404 |
| 2012/0200135 A1 | 8/2012 | Muto et al. | |
| 2015/0028644 A1* | 1/2015 | Hagan | B60N 2/809 297/410 |
| 2015/0329021 A1* | 11/2015 | Aquillue | B60N 2/80 297/391 |

FOREIGN PATENT DOCUMENTS

| | | |
|---|---|---|
| DE | 196 08 851 C2 | 9/2001 |
| DE | 199 45 585 B4 | 7/2006 |
| DE | 10 2010 031048 A1 | 1/2012 |
| EP | 1 609 665 B1 | 8/2011 |
| KR | 101 473 749 B1 | 12/2014 |

* cited by examiner

GUIDE SLEEVE FOR A VEHICLE SEAT

CROSS REFERENCE TO RELATED APPLICATIONS

This application is a United States National Phase Application of International Application PCT/EP2016/063488, filed Jun. 13, 2016, and claims the benefit of priority under 35 U.S.C. § 119 of German Application 10 2015 210 713.2, filed Jun. 11, 2015, the entire contents of which are incorporated herein by reference.

FIELD OF THE INVENTION

The invention relates to a guide sleeve for receiving a rod of a headrest. Furthermore, the invention relates to a vehicle seat for a motor vehicle with a backrest and with a headrest.

BACKGROUND OF THE INVENTION

EP 1 609 665 B1 describes a guide sleeve which is used for fastening a headrest to the backrest of a vehicle seat. The guide sleeve is introduced into an opening in the backrest of a vehicle seat and serves for receiving the rod of the headrest. In order to adjust the height of the headrest, the rod can be moved in the guide sleeve and can optionally be locked in a predetermined latching position.

Guide sleeves of this type have proven very successful in use. However, it has turned out to be disadvantageous that the rod of the headrest can be moved slightly in relation to the guide sleeve even in the locked position. Therefore, undesirable rattling noises may occur due to vibrations of the vehicle or of the vehicle seat. In order to reduce rattling noises, in the case of the guide sleeve known from EP 1 609 665 B1 two elastic regions are provided which are loaded with a spring force from the outside by means of a wire-shaped spring element.

Further guide sleeves with a sleeve body are known from DE 196 08 851 C2, DE 297 07 562 U2 and DE 197 17 942 A2. The sleeve bodies of the said guide sleeves each have two diametrically opposite elastic regions. The elastic regions are each loaded with a spring force by means of a spring element.

DE 199 45 585 B4 discloses a guide sleeve with a sleeve body which has a rod receptacle. Two elastic regions designed as tongues are provided on the sleeve body, said elastic regions being force-loaded in the direction of the rod receptacle in order to fix the rod in the rod receptacle. A shaped spring which completely embraces the sleeve body and via which the elastic regions are loaded with a spring force is arranged on the outer contour of the sleeve body.

SUMMARY OF THE INVENTION

It is an object of the invention to provide a guide sleeve with a spring element which has a more compact construction.

The object is achieved by a guide sleeve for receiving a rod of a headrest, comprising a sleeve body which has a rod receptacle for receiving the rod and an elastic region which is force-loaded in the direction of the rod receptacle in order to fix the rod in the rod receptacle, and comprising a spring element arranged on the outer contour of the sleeve body for loading the elastic region with a spring force, said spring element having a contact region lying against the elastic region, wherein the spring element is configured as a clip which partially embraces the sleeve body and has a width in the axial direction of the sleeve body, wherein the spring element is formed from a strip-type main body, wherein the contact region is configured as a protuberance between two first bending points extending across the entire width of the main body.

The object is also achieved by a guide sleeve for receiving a rod of a headrest, comprising a sleeve body which has a rod receptacle for receiving the rod and an elastic region which is pretensioned in the direction of the rod receptacle in order to fix the rod in the rod receptacle, and comprising a spring element arranged on the outer contour of the sleeve body for loading the elastic region with a spring force, said spring element having a contact region lying against the elastic region, wherein the spring element is configured as a clip which at least partially embraces the sleeve body and has a width in the axial direction of the sleeve body, and wherein the contact region extends in particular over the entire width of the spring element. In particular, it can be provided, according to alternative embodiments, that the contact region does not extend over the entire width of the spring element.

The spring element which is configured as a clip at least partially embraces the sleeve body, and therefore it is possible to fix the spring element to the sleeve body via a plurality of fastening points arranged in the circumferential direction of the sleeve body. The width of the spring element in the axial direction of the sleeve body can therefore be reduced in relation to a wire-shaped spring element. The contact region of the spring element extends in particular over the entire width of the spring element, and therefore as large a contact region as possible is provided, via which the elastic region of the sleeve body can be loaded with the spring force.

According to a preferred refinement, precisely one elastic region of the sleeve body is loaded via the spring element. Only one elastic region has to be manufactured per spring element, and therefore an outlay on production which is reduced in comparison to the prior art arises. The sleeve body can have precisely one elastic region and precisely one spring element. Alternatively, it is possible for the sleeve body to have a plurality of elastic regions and a plurality of spring elements, wherein the number of elastic regions and the number of spring elements is identical.

The spring element which is configured as a clip preferably only partially embraces the sleeve body. The clip particularly preferably extends in the circumferential direction of the sleeve body within a range of 40% to 60%, particularly preferably of 45% to 55%, of the circumference of the sleeve body.

According to an advantageous refinement, the contact region of the spring element is formed by a protuberance of the material of the spring element. The protuberance is preferably configured as a region of the spring element that is bent in the direction of the sleeve body. According to alternative embodiments, it is provided in particular according to the invention that the protuberance is configured as a region of the spring element that is stamped in the direction of the sleeve body or deformed in another way.

In an advantageous refinement, the spring element is formed from a strip-type main body, wherein the contact region is configured as a protuberance between two first bending points extending across the entire width of the main body. Such a refinement permits simplified manufacturing of the contact region by bending the strip-type main body without it being necessary to produce recesses in the main body. The bending points preferably run in the axial direction of the sleeve body. The spring element preferably has a W-shaped cross section.

Furthermore, it is advantageous if the spring element is formed by a strip-type main body and has two second bending points via which the two end regions of the main body are bent in the direction of the sleeve body. By means of the bending of the end region, prestressing of the spring element can be made possible in such a manner that the spring element lies against two opposite sides of the sleeve body.

The spring element preferably has two fastening recesses via which the spring element is fixable to the sleeve body. The fastening recesses are preferably arranged in the end regions of the strip-type main body of the spring element. The fastening recesses are particularly preferably fixed to fastening points of the sleeve body that are spaced apart from one another in the circumferential direction of the sleeve body. The fastening points of the sleeve body are preferably arranged diametrically opposite one another on the sleeve body.

The spring element preferably does not have any further recesses apart from the two fastening recesses, and therefore no further punching operations are required.

The elastic region is preferably provided integrally on the sleeve body. Alternatively, the elastic region can be configured as an insert which is connected to the sleeve body or is introduced into the rod receptacle of the sleeve body.

The spring element is preferably formed from a metal, in particular an elastic metal. The spring element can be formed, for example, from spring steels.

The sleeve body is particularly preferably formed from a material having high impact toughness, as a result of which the robustness of the guide sleeve in relation to an accident-induced impact action is increased. It has turned out to be advantageous if the sleeve body is formed from a polyamide, for example nylon or perlon. It is particularly advantageous if the sleeve body is formed from an impact-resistant modified polyamide, such as, for example, impact-resistant modified nylon or impact-resistant modified perlon. Alternatively, the sleeve body can be formed from in particular impact-resistant modified polyoxymethylene (POM).

It is advantageous if the guide sleeve has a locking element for locking the rod in a predetermined locking position in relation to the guide sleeve, and therefore the headrest can be fixed in a predetermined position in relation to the backrest.

According to an advantageous refinement, the elastic region has an outwardly protruding element. The contact region of the spring element is preferably exclusively in contact with the outwardly protruding element of the elastic region.

According to an advantageous refinement, the elastic region has an inwardly protruding element on that side of the elastic region which faces the rod receptacle. The inwardly protruding element is preferably arranged in the axial direction of the sleeve body at the same height as the outwardly protruding element.

The object is furthermore achieved by a vehicle seat for a motor vehicle with a backrest and with a headrest, wherein an above-described guide sleeve is arranged on the backrest in order to fasten the headrest to the backrest.

The advantageous features described in conjunction with the guide sleeve can be used on their own or also in combination in the vehicle seat.

Further details and advantages of the invention are described below with reference to the exemplary embodiment which is illustrated in the figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
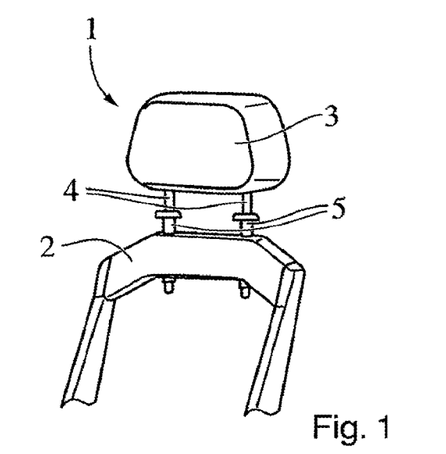
FIG. 1 is a view showing part of a vehicle seat in a perspective illustration.

Referring to the drawings, FIG. 1 illustrates a vehicle seat 1 for a motor vehicle, which vehicle seat can be designed as a front seat or as a rear seat. The vehicle seat 1 has a backrest 2, of which only a frame is illustrated in FIG. 1. Arranged above the backrest 2 is a headrest 3 which has two rods 4 which run in parallel and are introduced into openings provided on the upper side of the backrest 2.

Arranged in each of the openings of the backrest 2 is a guide sleeve 5, via which the rods 4 can be fixed to the backrest 2 of the vehicle seat 1.

Figures 2, 3:
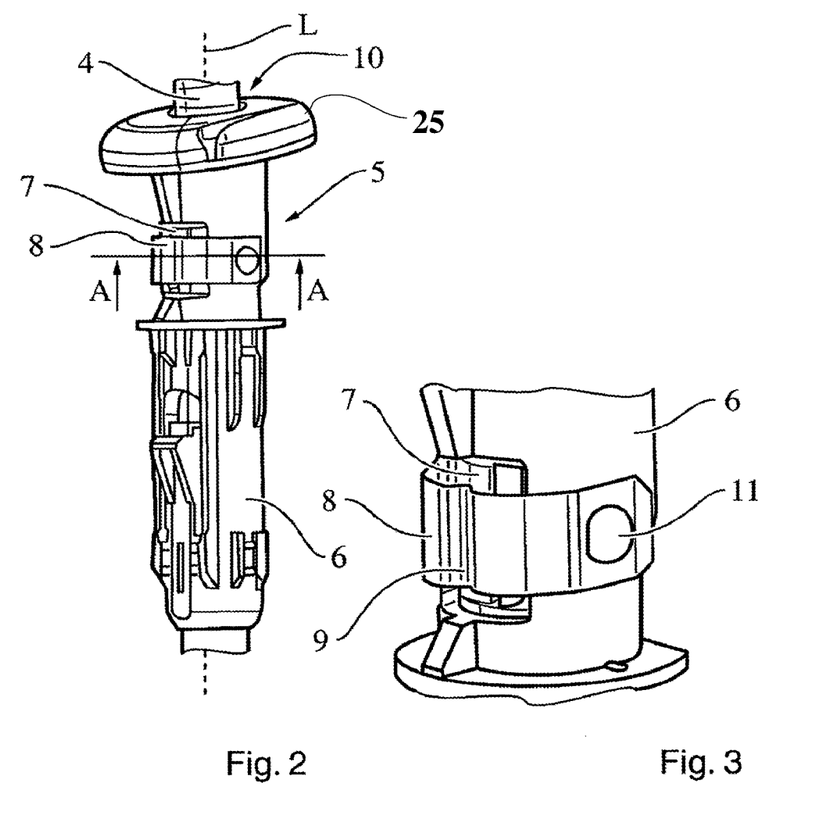
FIG. 2 is a view showing a guide sleeve according to a first exemplary embodiment in a side view.
FIG. 3 is a view showing a detailed view of the guide sleeve according to FIG. 2.

As can be gathered from the illustration in FIG. 2, the guide sleeve 5 has a substantially elongate construction. The guide sleeve 5 has an integrally formed sleeve body 6 which extends along a longitudinal axis L. A rod receptacle 10 in which the rod 4 of the headrest is accommodated is provided in the sleeve body 6. In the exemplary illustration according to FIG. 2, the rod receptacle 10 has a circular cross section; however, this should not be interpreted as being a limiting refinement: it is possible, according to alternative embodiments, that the rod receptacle 10 has an oval or non-circular cross section. The rod 4 can be locked in a plurality of predetermined positions by a locking element 25 of the guide sleeve 5, wherein the rod 4 protrudes to a greater or lesser extent from the rod receptacle 10. In order to adjust the height of the headrest 3, the rod can be moved between said predetermined positions. The sleeve body 6 of the guide sleeve 5 is formed from a plastic having high impact toughness, as a result of which the robustness of the guide sleeve in relation to an accident-induced impact action is increased. For example, the sleeve body can be formed from in particular impact-resistant modified polyoxymethylene (POM).

The guide sleeve 5 furthermore has an elastic region 7 which is provided integrally on the sleeve body 6. The elastic region 7 is pretensioned in the direction of the rod receptacle 10 in order to fix the rod in the rod receptacle and in particular to avoid rattling noises. Furthermore, a spring element 8 via which the elastic region 7 is loaded with a spring force is arranged on the outer contour of the sleeve body 6. The spring element 8 is configured in the manner of a clip which partially embraces the sleeve body 6. Furthermore, the spring element 8 has a contact region 9 which lies against the elastic region 7. The contact region 9 of the spring element 8 extends in particular over the entire width of the spring element 8, i.e. over the entire extent of the spring element 8 in the axial direction of the sleeve body 6. The spring element 8 can compensate for a decrease in the pretensioning of the elastic region 7, and thus rattling noises are effectively avoided.

Figure 4:
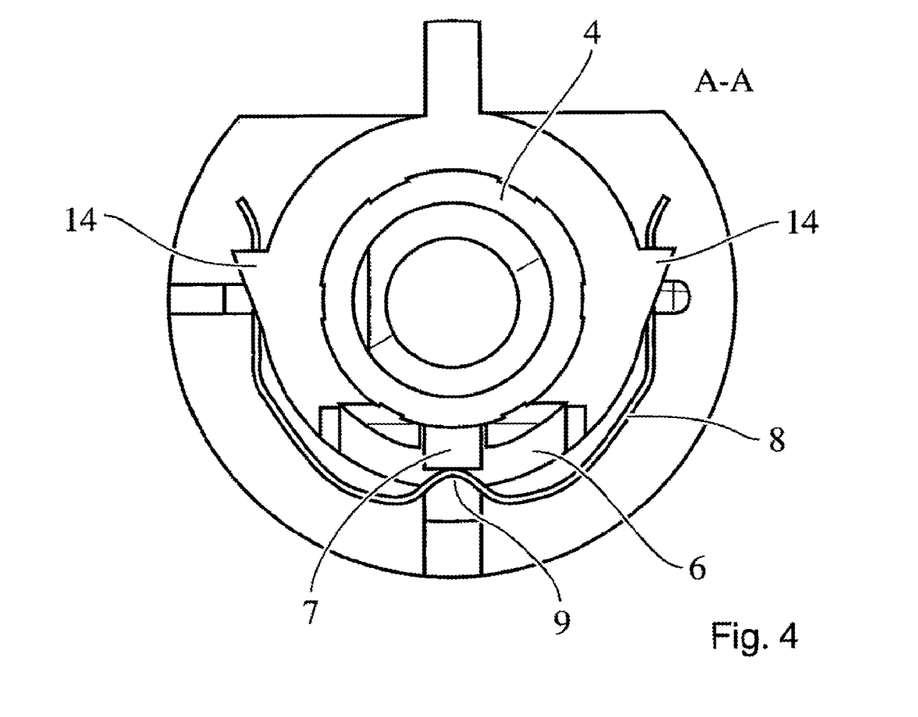
FIG. 4 is a view showing the guide sleeve according to FIG. 2 in a sectional illustration according to the intersecting line A-A in FIG. 2.

In the position shown in FIGS. 3 and 4, the rod 4 of the headrest 3 lies directly against the elastic region 7. By this means, the rod 4 is fixed within the rod receptacle 10, and undesirable rattling noises which may arise due to small movements of the rod 4 in the guide sleeve 5 are reduced. The pretensioning of the elastic region 7 can decrease over time. The spring element 8 which lies from the outside against the elastic region 7 can compensate for such a decrease in the pretensioning.

Figure 5:
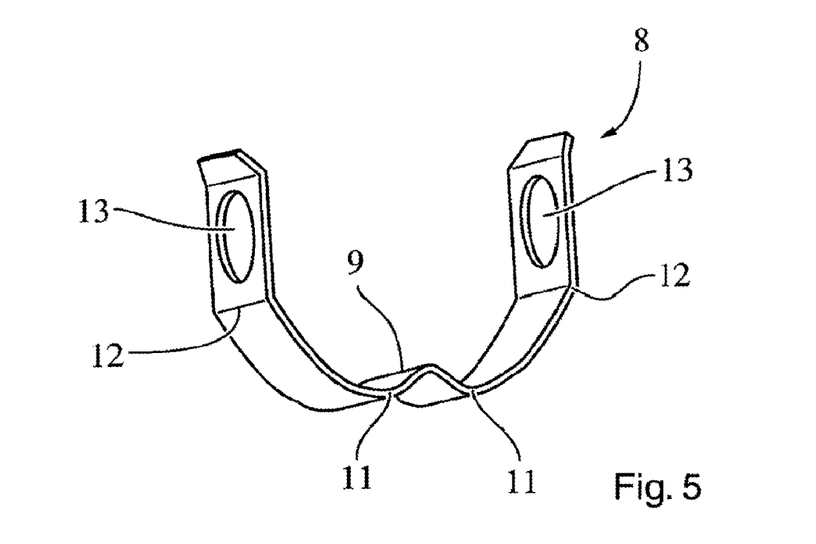
FIG. 5 is a view showing a spring element in a perspective illustration.

As can be gathered from the illustration in FIG. 5, the spring element 8 is formed by a strip-type main body and has two first bending points 11 which extend over the entire width of the main body and between which the contact region 9 is configured as a protuberance. The first bending points 11 run in the axial direction with respect to the sleeve body 6, i.e. parallel to the longitudinal axis L. As illustrated in FIG. 5, the spring element 8 has a W-shaped cross section.

In addition, two second bending points 12 are provided on the main body of the spring element 8, via which the two end regions of the main body are bent in the direction of the sleeve body 6. By means of the bending of the end regions, pretensioning of the spring element 8 can be made possible in such a manner that the spring element 8 lies against two opposite sides of the sleeve body 6.

Figure 6:
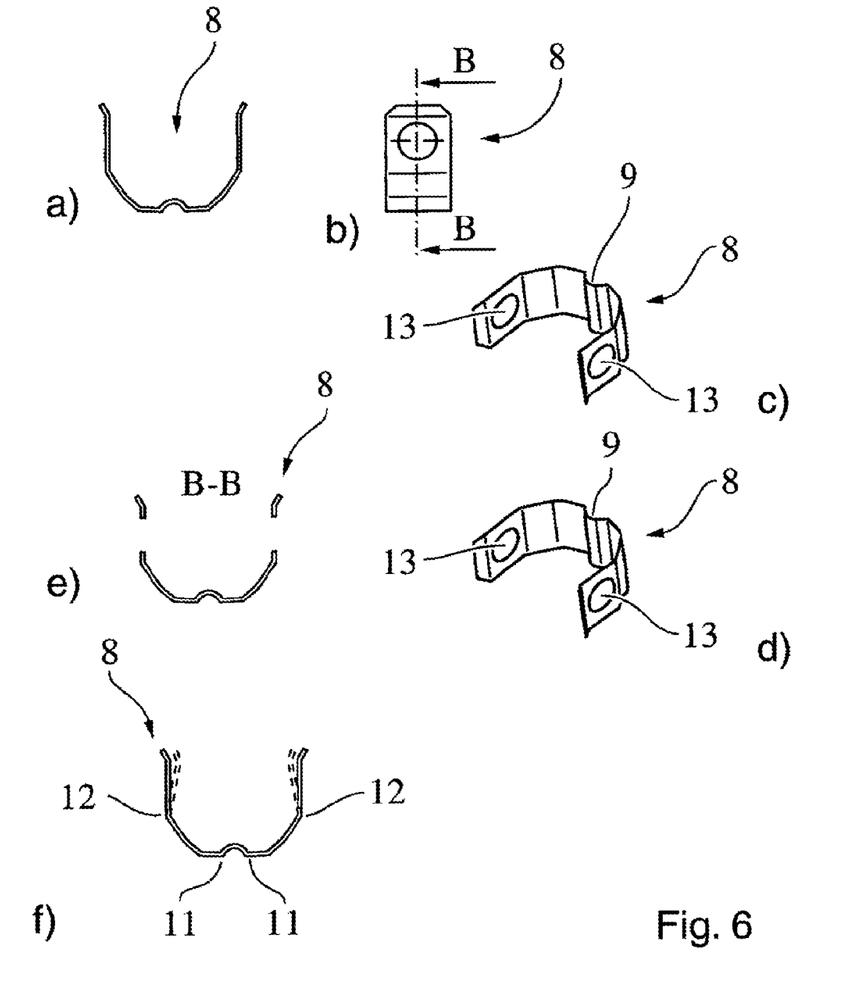
FIG. 6 is a view showing various views and sectional illustrations of the spring element according to FIG. 5.

Furthermore, the spring element 8 has two fastening recesses 13 via which the spring element 8 is fixable to the sleeve body 6. The fastening recesses 13 are preferably arranged in the end regions of the strip-type main body of the spring element 8. As shown in FIGS. 4-6, the recesses 13 are through holes defined by the strip main body of the spring element 8. The fastening recesses 13 are fixed to fastening points 14 of the sleeve body that are spaced apart from one another in the circumferential direction of the sleeve body 6. As shown in FIG. 4, the fastening points 14 extended through the recesses 13 formed as through holes. The fastening points 14 of the sleeve body 6 are arranged diametrically opposite one another on the sleeve body 6.

FIGS. 6a-f show various views and sectional illustrations of the spring element 8. Within the context of the production of the spring element 8, the strip-type main body is first of all provided with the two fastening recesses 13 and the first bending points 11 and the second bending points 12, thus resulting in a spring element 8 as is illustrated in FIG. 6c or with solid lines in FIG. 6f. The end pieces of the main body are then bent toward each other such that the spring element takes on the shape which is shown by dashed lines in FIG. 6d and FIG. 6f and in which the spring element 8 has pretensioning, by means of which the end pieces of the spring element can lie against two opposite sides of the sleeve body 6.

Figure 7:
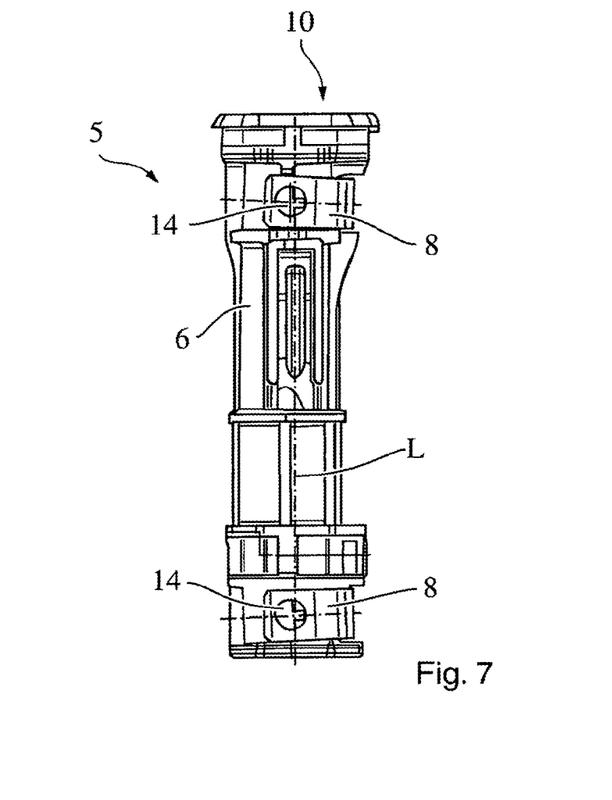
FIG. 7 is a view showing a guide sleeve according to a second exemplary embodiment in a side view.

The illustration in FIG. 7 shows a guide sleeve 5 according to an alternative refinement. The guide sleeve 5 has an integrally formed sleeve body 6 which extends along a longitudinal axis L. A rod receptacle 10 in which the rod of the headrest is accommodated is provided in the sleeve body 6. In contrast to the cylindrical rod receptacle 10 which is shown in FIG. 2 and into which a rectilinear rod 4 is insertable, the rod receptacle 10 according to FIG. 7 is of bent design. In this respect, a bent rod can be accommodated in the rod receptacle according to FIG. 7. The rod receptacle 10 has a curvature in relation to the longitudinal axis L of the sleeve body 6, said curvature being adapted to the curvature of the rod. In order to adjust the height of the headrest, the rod can be moved between predetermined positions. The sleeve body 6 of the guide sleeve 5 is formed from a plastic having high impact resistance, as a result of which the robustness of the guide sleeve in relation to an accident-induced impact action is increased. For example, the sleeve body can be formed from in particular impact-resistant modified polyoxymethylene (POM).

Furthermore, the guide sleeve 5 has two elastic regions (concealed by the spring element 8 in FIG. 5) which are each provided integrally on the sleeve body 6. The elastic regions are force-loaded in the direction of the rod receptacle 10 in order to fix the rod in the rod receptacle 10 and in particular to avoid rattling noises. Arranged on the outer contour of the sleeve body 6 is a spring element 8, by means of which the elastic region 7 is loaded with a spring force. The spring element 8 corresponds to the spring element 8 shown in FIG. 6. The spring element 8 is configured in the manner of a clip which only partially surrounds the sleeve body 6. This means that the spring element does not extend completely around the sleeve body 6 in a circumferential direction. The spring element 8 has a width in the axial direction of the sleeve body 6. It is formed from a strip-type main body, wherein the contact region 9 is configured as a protuberance between two first bending points extending over the entire width of the main body.

Figure 8:
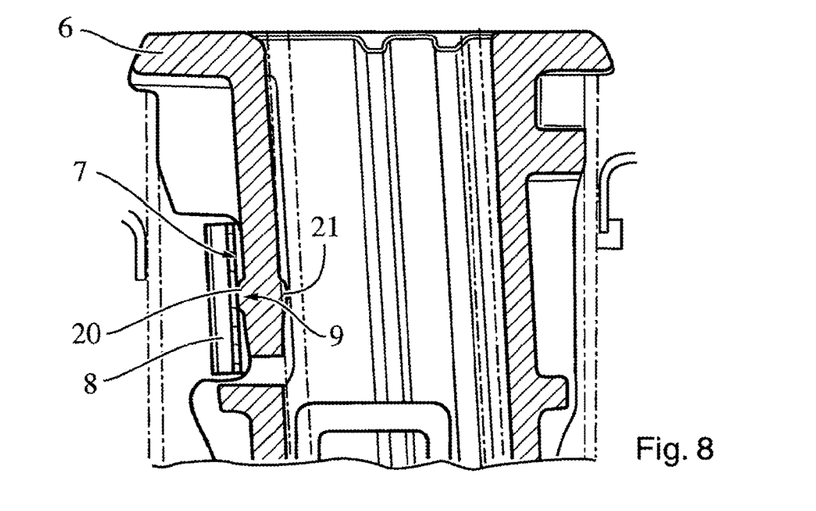
FIG. 8 is a view showing the guide sleeve according to FIG. 7 in a sectional illustration in the region of the upper spring element.

As can be gathered from the sectional illustration in FIG. 8, the spring element 8 has a contact region 9 which lies against the elastic region 7. The contact region 9 of the spring element 8 does not extend over the entire width of the spring element 8, i.e. over the entire extent of the spring element 8 in the axial direction of the sleeve body 6. The contact region 9 of the spring element 8 is exclusively in contact with an outwardly protruding element 20 of the elastic region 7. The outwardly protruding element 20 is configured in the manner of an elevation which has an extent in the axial direction of the sleeve body that is smaller than the width of the spring element 8 in the axial direction. The outwardly protruding element 20 is therefore arranged on that side of the elastic region 7 which faces away from the rod receptacle 10.

Furthermore, the elastic region 7 has an inwardly protruding element 21 on that side of the elastic region 7 which faces the rod receptacle 10. The inwardly protruding element 21 is configured in the manner of an elevation which has an extent in the axial direction of the sleeve body that is smaller than the width of the spring element 8 in the axial direction. By means of the spring force, the inwardly protruding element 21 is pressed against the rod accommodated in the rod receptacle 10. The inwardly protruding element 21 is arranged in the axial direction of the sleeve body 6 at the same height as the outwardly protruding element 20.

The illustration in FIG. 8 furthermore shows that the inwardly protruding element 21 has an asymmetric curvature. The curvature of the inwardly protruding element 21 is deeper on a first side, which lies closer to an opening of the rod receptacle 10, than on a second side, which is arranged further away from the opening of the rod receptacle 10. This shape is achieved by the sleeve body 6 being produced by means of injection molding. During the injection molding, a core which has a recess or notch at the point at which the inwardly protruding element 21 is intended to be formed is arranged within the rod receptacle 10. When the core is removed through the opening of the rod receptacle 10 in the manner of forced removal, that side of the inwardly protruding element 21 which faces away from the opening is deformed in such a manner that the curvature thereof is reduced.

By means of the spring element 8, a decrease in the pretensioning of the elastic region 7 can be compensated for, and therefore rattling noises are effectively avoided. Furthermore, manufacturing tolerances can be compensated for without a relatively great effect on the freedom of adjustment and the freedom of the headrest from rattling.

The above-described guide sleeves for receiving a rod 4 of a headrest 3 each comprise a sleeve body 6 which has a rod receptacle 10 for receiving the rod 4 and an elastic region 7 which is forced-loaded in the direction of the rod receptacle 10 in order to fix the rod 4 in the rod receptacle 10. Furthermore, the guide sleeve comprises a spring element 8 arranged on the outer contour of the sleeve body 6 for loading the elastic region 7 with a spring force, the spring element having a contact region 9 lying against the elastic region 7, wherein the spring element 8 is configured as a clip which partially embraces the sleeve body 6 and has a width in the axial direction of the sleeve body 6, wherein the spring element 8 is formed from a strip-type main body, wherein the contact region 9 is configured as a protuberance between two first bending points 11 extending over the entire width of the main body.

While specific embodiments of the invention have been shown and described in detail to illustrate the application of the principles of the invention, it will be understood that the invention may be embodied otherwise without departing from such principles.

The invention claimed is:

1. A guide sleeve for receiving a rod of a headrest, the guide sleeve comprising:
   a sleeve body which has a rod receptacle for receiving the rod and an elastic region which is force-loaded in a direction of the rod receptacle in order to fix the rod in the rod receptacle; and
   a spring element arranged on the outer contour of the sleeve body for loading the elastic region with a spring force, said spring element having a contact region lying against the elastic region, wherein the spring element is configured as a clip which partially embraces the sleeve body and has a width in an axial direction of the sleeve body, wherein the spring element is formed from a strip main body, wherein the contact region is configured as a protuberance between two bending points extending across an entire axial width of the strip main body, the spring element defining two fastening recesses via which the spring element is fixable to the sleeve body, the two fastening recesses being formed as through holes defined by the strip main body.

2. The guide sleeve as claimed in claim 1, wherein the clip extends in a circumferential direction of the sleeve body within a range of 40% to 60% of the circumference of the sleeve body.

3. The guide sleeve as claimed in claim 1, wherein the protuberance is configured as a region of the spring element that is bent in a direction of the sleeve body.

4. The guide sleeve as claimed in claim 1, wherein the spring element has a W-shaped cross section.

5. The guide sleeve as claimed in claim 1, wherein the spring element formed from the strip-type main body has another two bending points via which two end regions of the main body are bent in a direction of the sleeve body.

6. The guide sleeve as claimed in claim 1, wherein the fastening recesses are fixed to fastening points of the sleeve body that are diametrically opposite from one another on the sleeve body.

7. The guide sleeve as claimed in claim 1, wherein the spring element is formed from spring steel.

8. The guide sleeve as claimed in claim 1, wherein the sleeve body is formed from a polyamide or from polyoxymethylene (POM).

9. The guide sleeve as claimed in claim 1, wherein the guide sleeve has a locking element for locking the rod in a predetermined locking position in relation to the guide sleeve.

10. The guide sleeve as claimed in claim 1, wherein the elastic region has an outwardly protruding element.

11. The guide sleeve as claimed in claim 10, wherein the elastic region has an inwardly protruding element on a side of the elastic region which faces the rod receptacle, wherein the inwardly protruding element is arranged, in the axial direction of the sleeve body, at a same height as the outwardly protruding element.

12. A vehicle seat for a motor vehicle, the vehicle seat comprising:
   a backrest with a rod;
   a headrest; and
   a guide sleeve arranged on the backrest to fasten the headrest to the backrest, the guide sleeve comprising:
   a sleeve body which has a rod receptacle for receiving the rod and an elastic region which is force-loaded in a direction of the rod receptacle in order to fix the rod in the rod receptacle; and
   a spring element arranged on the outer contour of the sleeve body for loading the elastic region with a spring force, said spring element having a contact region lying against the elastic region, wherein the spring element is configured as a clip which partially embraces the sleeve body and has a width in an axial direction of the sleeve body, wherein the spring element is formed from a strip main body, wherein the contact region is configured as a protuberance between two first bending points extending across an entire axial width of the strip main body, the spring element defining two fastening recesses via which the spring element is fixable to the sleeve body, the two fastening recesses being formed as through holes defined by the strip main body.

13. The vehicle seat as claimed in claim 12, wherein the clip extends in a circumferential direction of the sleeve body within a range of 40% to 60% of a circumference of the sleeve body.

14. The vehicle seat as claimed in claim 12, wherein the protuberance is configured as a region of the spring element that is bent in a direction of the sleeve body.

15. The vehicle seat as claimed in claim 12, wherein the spring element formed from the strip-type main body has another two bending points via which two end regions of the main body are bent in a direction of the sleeve body.

16. The vehicle seat as claimed in claim 12, wherein:
the fastening recesses are fixed to fastening points of the sleeve body that are diametrically opposite from one another on the sleeve body.

17. The vehicle seat as claimed in claim 12, wherein:
the spring element is formed from spring steel; and
the sleeve body is formed from a polyamide or from polyoxymethylene (POM).

18. The vehicle seat as claimed in claim 12, further comprising a locking element for locking the rod in a predetermined locking position in relation to the vehicle seat.

19. The vehicle seat as claimed in claim 12, wherein:
the elastic region has an outwardly protruding element; and
the elastic region has an inwardly protruding element on a side of the elastic region which faces the rod receptacle; and
the inwardly protruding element is arranged in the axial direction of the sleeve body at a same height as the outwardly protruding element.

20. The guide sleeve as claimed in claim 1, wherein:
the sleeve body includes fastening points, the fastening points and the two recesses being configured to have the fastening points extend through the two recesses.

* * * * *